United States Patent [19]

Schmoldt et al.

[11] 4,350,581
[45] Sep. 21, 1982

[54] ELECTRODIALYSIS-CELL ASSEMBLY

[75] Inventors: Harm Schmoldt, Hamburg; Klaus Kock; Heinrich Strathmann, both of Tubingen, all of Fed. Rep. of Germany

[73] Assignee: Forschungsinstitut Berghof GmbH, Tobingen, Fed. Rep. of Germany

[21] Appl. No.: 198,368

[22] Filed: Oct. 20, 1980

[30] Foreign Application Priority Data

Nov. 16, 1979 [DE] Fed. Rep. of Germany ....... 2946284

[51] Int. Cl.³ .............................................. B01D 13/02
[52] U.S. Cl. .................................................. 204/301
[58] Field of Search ............................ 204/180 P, 301

[56] References Cited

U.S. PATENT DOCUMENTS

| 3,878,086 | 4/1975 | Haswell et al. | 204/301 |
| 3,933,617 | 1/1976 | Yamamoto et al. | 204/301 |
| 4,217,200 | 8/1980 | Kedem et al. | 204/301 |

Primary Examiner—Howard S. Williams
Attorney, Agent, or Firm—Robert A. Cesari; John F. McKenna; Andrew F. Kehoe

[57] ABSTRACT

Novel electrodialysis apparatus in which the frames form fluid directing paths, thereby assuring a strictly parallel flow path of both diluted and concentrated process solutions.

7 Claims, 2 Drawing Figures

3-POSITION-TYPE 2-2-POSITION 1-POSITION-TYPE

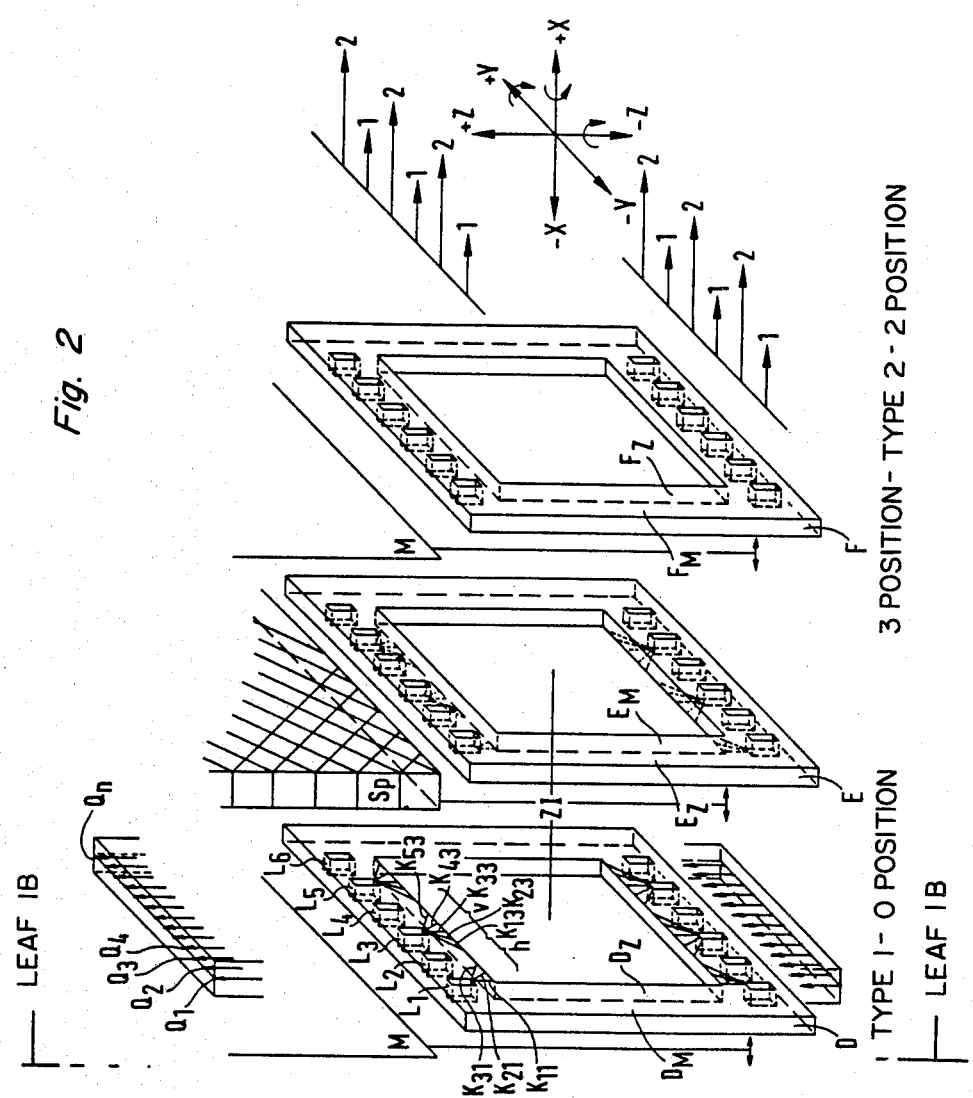

ELECTRODIALYSIS-CELL ASSEMBLY

BACKGROUND OF THE INVENTION

In the desalination of ionogenic solution with the aid of the electrodialysis there are arranged cation and anion exchanger diaphragms in alternating sequence between two electrodes in such a way that there develop between the diaphragms, in each case, closed chambers. Through the application of an electric field between the electrodes the anions migrate in direction toward the anode, and the cations in direction of the cathode. The anions can hereby pass the positively charged anion exchanger diaphragm, but are held back by the cation exchanger diaphragm. The cations migrating to the cathode pass the negatively charged cation exchanger diaphragm, but are held back by the anion exchanger diaphragm. Through this there result alternating chambers in which takes place a salt enrichment (concentration) and a desalination. In the practical application of electrodialysis the individual cells are continuously flushed with a diluted and a concentrated solution. For the economical operation of the process it is however of particular importance that the velocities of flow in the two cells are as uniform as possible so that there cannot occur a concentration polarization on the diaphragm surfaces. Furthermore, any passage of the concentrated solution into the diluted solution through leaks into the chambers separated through the ion exchanger diaphragms must be prevented. For this reason the design of the chambers presents quite a considerable problem in the construction of an electrodialysis unit. On most of the currently used electrodialysis units the diaphragms are always separated from each other by a frame of plastic material. These plastic frames are provided with perforations for the supply of the desalinated and the concentrated solution. The diaphragms are mechanically sealed on the frames. Since the individual chambers for the concentrated and desalinated solution are alternatingly arranged in one cell assembly, it is necessary that the supply of the concentrate or of the desalinated solution, respectively, likewise takes place alternating into the cell.

In general the flow approach of a cell occurs diagonally in a corner of the cell, and the withdrawal of the solution takes place at the opposite side of the cell so that the flow of the concentrate and of the desalinated solution is guided exactly contrarily on both sides of the diaphragm. This causes that the flow distribution in the chambers is not optimal and that there develop zones of low intermixture and thus increased concentration polarization. In addition, as a result of the differing flow approach the pressure drops in the chambers with the concentrated and the desalinated solution are not always equal and this causes pressure differences between the cells. This results in an additional load on the diaphragm and possibly a change of the geometry of the cell. Furthermore, in case of a mechanical sealing of the diaphragms of usually rough surface there frequently occur leaks which can cause an escape of the solution from the concentrated one into the desalinated solution. All these effects considerably affect the economy of the process.

SUMMARY

An object of the present invention is the development of an electrodialysis cell that permits an optimal flow approach of the diluted and concentrated solution at the same time reliably prevents leakage of the cell assembly towards the outside and also a passing of the concentrated solution into the chamber with the diluted solution.

The invention resolves this task in that, that two-part diaphragm frames were developed upon which on one side (diaphragm side) the respective associated diaphragm is firmly cemented, while because of superposing of the respective other sides of the diaphragm frame (cell side) there arises between the cemented-on diaphragms a closed chamber. Through the joining together in a row of several diaphragm frames there is formed a series of chambers which are developed in each case out of two cell frames and which are flowed-through in alternating sequence, parallel, by a desalinated and a concentrated solution. All cell frames have the same thickness and the developed chambers have consequently the same geometrical dimensions. Given identical amounts of throughput, there appears in all chambers the same drop in pressure so that there exists between two chambers across the diaphragm no pressure differential. Furthermore, the cell frames are so constructed that they can be used both for forming chambers with the concentrated, and also for chambers with the diluted solutions.

DETAILED DESCRIPTION OF AN ILLUSTRATIVE EMBODIMENT

In this application there is shown and described preferred embodiments of the invention and suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it, each as may be best suited in the condition of a particular case.

BRIEF DESCRIPTION OF THE DRAWINGS

FIGS. 1 and 2 illustrate the position and structure of cell frames, diaphragms and spacers and the orientation thereof in a schematic electrodialysis cell.

Figure 1:
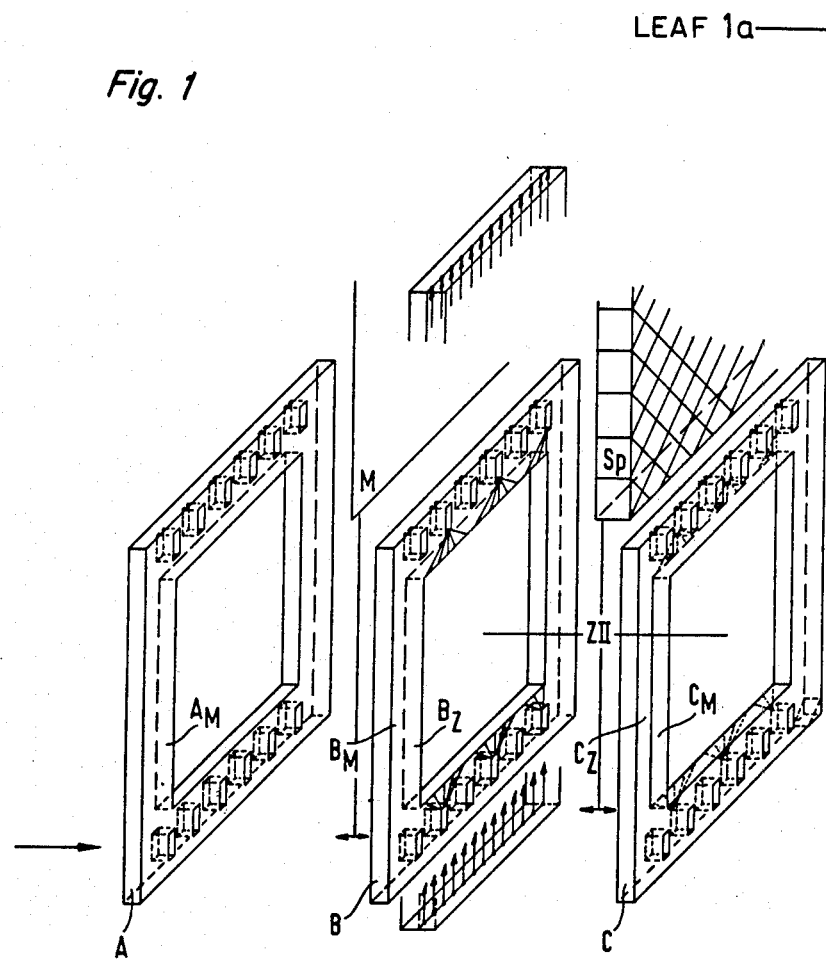

1. Definition and description of the individual components of the system.

1.1 Cell frames:

These frames are denoted with A,B,C,D . . . . The frames consist of plastic material and have a uniform thickness—depending on the demands of the application—of 0.5 to 5.0 mm. The width of the lateral parts that form the frames is adapted to the functions they have to carry out and is further dependent on the overall size of the frames. It ranges from a fraction of a millimeter to several centimeters.

1.2 Diaphragm side of the cell frame

As diaphragm side of the cell frame is denoted that side upon which rests the diaphragm.

The surfaces of the diaphragm are absolutely flat and even. They can be specially treated for the laying on of the diaphragm. The diaphragm sides of the cell are denoted with $A_m$; $B_m$; $C_m$; . . . .

1.3 Cell side of the cell frame

This side of the cell frame faces towards the cell and is denoted with $A_z$; $B_z$; $C_z$ . . . . The surfaces of the cell side are flat and even. This side of the cell frame takes up parts of the cell flow-approach system denoted with $K_{ij}$ and $L_i$ (wherein i, j, each are 1,2,3 ... n).

1.4 Flow-thru system

This term denotes a system of perforations that is arranged in opposite sides of the cell frame in mirror symmetry to the Y axis. The individual holes have a geometric form that is adapted to the flow requirements and are equidistantly distributed over the respective length of the lateral part in such a way that the axes of the outer holes $L_1$ and $L_{2 \times n}$ represent the prolongations of the lateral inside space limitations of the cell frame.

The flow penetrates the cell frames in this system vertical to the plane of the frame. There is always an even number of holes in the respective parts that it is possible to assigning always the same number of holes to the two separate hydraulic circulations.

1.5 Standardized position of the cell frame—0 position

With standardized position of a cell frame is meant the following: The frame lies in the plane Y-Z. The diaphragm side $D_m$ of the frame shows in $-X$-direction, the cell side of the frame $D_z$ in $+X$-direction. The flow-thru systems are arranged in the lateral parts of the frame, which lie in $+Z$- and $-Z$-direction.

1.6 Standardization of the flow-thru system

The cell frame lies in standardized position. The spread of the flow-thru system lies then in direction of the Y-axis, whereby the designation of the individual holes of the system is carried out with progressively ascending Y values.

The designation of the holes is then $L_1; L_2; L_3 \ldots L_{2n}$, (n=1,2,3 ... ).

To all holes with odd index—i.e. $L_1; L_3; L_5 \ldots L_{2n-1}$ is then assigned the hydraulic circulation 1, to all holes with even index, i.e. $L_2; L_4 \ldots L_{2n}$ is assigned the hydraulic circulation 2.

1.7 Cell flow-approach system

The cell flow approach system $K_{ij}$ is located on the cell side of the cell frame and represents first the connection—in the cell frame hydraulically still undefined—of the holes $L_i$ assigned to one circulation with the frame inner space, and this, in such a way that, starting from a hole $L_i$, a fan-like system of channel-like indentations with hydraulically coordinated cross sections intersects the corresponding line of the inside space limitations of the cell frame in even spacings. The fan-like channel system that starts from a hole $L_1$ consists always of an odd number of channels, whereby generally one channel runs in the center axis of hole $L_1$. The channels starting out from the hole $L_i$ are denoted with $K_{1i}; K_{2i} \ldots K_{2n+1 i}$ in direction of ascending Y coordinates. The fan of the channels is as a rule in mirror symmetry to the center axis of the hole. Such a mirror symmetrical system is denoted as a full system v. If one side of the full system is missing, then this system is designated as a half system h, whereby the channel in the center axis is always present.

1.8 Standardization of the cell flow-approach system

The cell frame lies in standardized position. Then there starts from hole $L_1$ a half flow approach system, from hole $L_3$ a full, from hole $L_5$ a full system etc. Due to the symmetry of the flow-thru system around the Y axis also the cell flow approach system in the opposite lateral parts is in mirror symmetry around the Y axis. While the flow-thru system around the Z-axis was still mirror symmetrical, the cell flow approach system, because of its aforementioned arrangment, is asymmetrical around this axis.

1.9 Cell frame positions 1.9.1. Standardized position or 0 position 1.9.2. 1-position This position arises from the 0-position through a 180° turn of the cell frame around the Z axis.

1.9.3. 2-position

This position arises from the 0-position through a 180° turn of the cell frame around the X axis.

1.9.4. 3-position

This position arises from the 0-position through a 180° turn of the cell frame around the Y axis.

1.10 Diaphragm frame

A diaphragm frame consists of 3 components:
1. The diaphragm M
2. Two cell frames of variable position.

A diaphragm frame is assembled in the following manner:
1. One cell frame is in 0-position On the diaphragm side of this frame is affixed by means of a specially developed adhesive cement the diaphragm M.

The adhesive can be a two component adhesive which is an epoxy resin sold under the trade name "Rezdin" by Lechler-Chemie (Germany) and which is consisting of 12 parts hardening agent, 8 parts binding agent, and 10 parts butanol for adjusting the viscosity of the adhesive. An example of a normally tacky and pressure-sensitive adhesive is the one sold as Typ K 35 by Kömmerling (Germany) which is consisting of 80 parts ethylacetate, 220 parts butylacetate, and 20 parts toluene.

2. Onto this combination represented under (1) is then attached by means of the above cement the diaphragm side of a cell frame in 1-position with the diaphragm.

There results thus, as defined, 2 different diaphragm frame types on account of the 2 possible position combinations:

Type 1: Position 1—position 0
Type 2: Position 3—position 2

1.11 Cell construction

A cell results now through suitable superposing of the individual diaphragm frame types, and this, in the following manner:

1. Onto the cell side in 0-position of the diaphragm frame type 1 is laid the cell side in 3-position of the diaphragm frame type 2. There results here a cell that is denoted with Z I.
2. A further cell, to be denoted with Z II, results through the superposing of the cell side in 1-position of the diaphragm frame type 1 onto the cell side in 2-position of the diaphragm frame type 2.

The flat surfaces of the cell sides of the individual diaphragm frames are now pressed together with a pressure that ensures the internal as well as the external tightness—they act now combined as seals.

The cell approach system $K_{ij}$—hydraulically still undefined in the diaphragm frame—provides now, laid one upon the other, because of its geometric design, hydraulically accurately defined cell flow approach cross section $Q_i$, which are uniformly distributed across the inflow or outflow side. Through the asymmetric development to the Z axis of the cell flow approach system and through the aforesaid arrangement of the individual diaphragm frames the cell Z I is now connected with the hydraulic circulation 1, and cell II with the hydraulic circulation 2. As diaphragm range spacer and to provide a process-technologically desirable turbulence in the cell flow there is inserted a so-called spacer—denoted with Sp—into the cells. This spacer consists of plastic and is designed in agreement with its function. It can be a constituent of the cell as an individual component, but it can also be integrated in the respective cell frame.

The invention thus provides an electrodialysis cell assembly, characterized in that, its cells are formed in such a manner out of two frames each that the individual frames are cemented or welded with the diaphragm (membrane), whereby the two frames are so shaped that they form in each case chambers of identical geometrical dimensions and enforce a strictly parallel process path of the diluted and concentrated solution.

The invention also provides a cell assembly additionally characterized in that there exists a strict separation of function of the individual components in that, the diaphragm has no external and internal seal function and no flow guide functions in the range of approaching flow, but has exclusively exchanger functions, whereby sealing and flow guiding functions are taken over by the construction suited for this.

The invention further provides a cell assembly as described above in which the cell frames are so designed (shaped) that the same cell frames can be used for forming the two different cells for diluted and concentrated circulation, in that through rotation around the different axes the necessary combinations can be produced.

It is also understood that the following claims are intended to cover all of the generic and specific features of the invention herein described and all statements of the scope of the invention which might be said to fall therebetween.

What is claimed as new and desired to be secured by Letters Patent of the United States is:

1. In an electrodialysis apparatus of the type comprising a series of cells formed of membranes and frame members which are bonded together to form a consolidated apparatus, the improvement wherein said frame members form chambers of substantially identical dimensions and wherein said adjacent frame members comprise flow-distribution conduit formed along substantially the entire perimeter of at least one side of said frame member.

2. In apparatus as defined in claim 1 wherein said flow-distribution conduit means is a plurality of fan-shaped conduits arranged side by side across said perimeter.

3. Apparatus as defined in claims 1 or 2 wherein frame member of a non-terminal cell in said apparatus comprises said flow-distribution conduit means at the top and bottom perimeter of each frame on a cell-side of each said frame.

4. An electrodialysis apparatus as defined in claim 1 of the type comprising a series of cells formed by frame members which contain apertures for process fluids, and which are only bonded together and to membranes to form a consolidated dialysis apparatus, the improvement wherein said bonded frame members are of substantially identical dimensions, wherein each of said frame members bonds an ion membrane on one side thereof and to another said frame member on the other side thereof, and wherein any spacer is placed only between the adjacent membranes and within area framed by said frame members but not between the bonded faces of said frame members.

5. Apparatus as defined in claim 4 wherein each frame member is of identical dimensions with an adjacent frame member and, when turned 180 angular degrees, forms with said adjacent frame member flow distribution conduits along substantially the entire length of each of at least one side of a membrane.

6. Apparatus as defined in claims 4 or 5 wherein said flow distribution conduits comprise a plurality of fan-shaped conduits.

7. Apparatus as defined in claim 4 wherein said flow conduits are along substantially the entire length of the top and bottom of a membrane.

* * * * *